Figure 1:
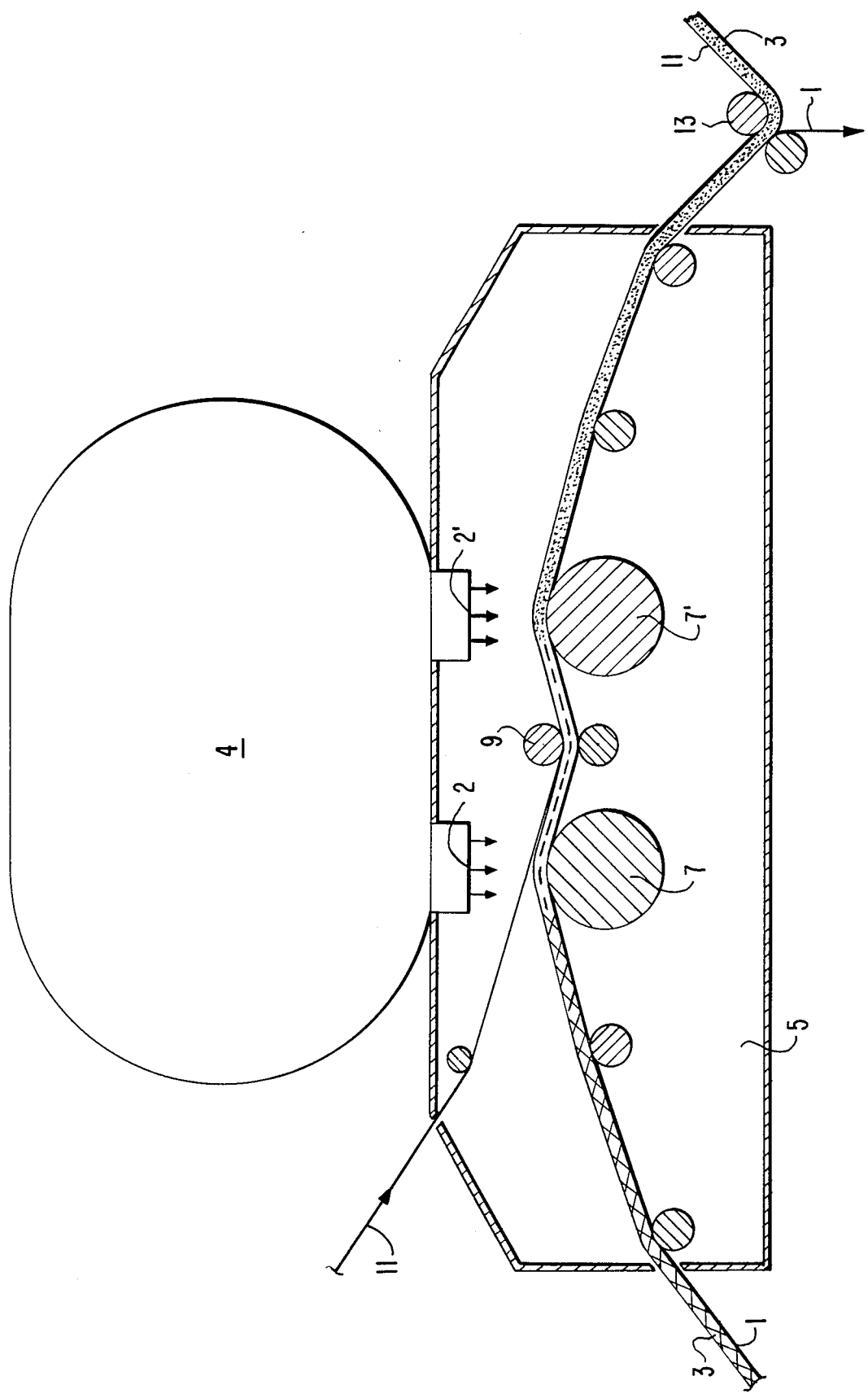

United States Patent [19]

Tripp, III et al.

[11] Patent Number: 4,642,244
[45] Date of Patent: Feb. 10, 1987

[54] METHOD OF AND APPARATUS FOR ELECTRON BEAM CURING COATED, POROUS AND OTHER WEB STRUCTURES

[75] Inventors: Edwin P. Tripp, III, Wilmington; Jason Weisman, Newton, both of Mass.; George Hissong, Kennebunk, Me.

[73] Assignee: Energy Sciences Inc., Woburn, Mass.

[21] Appl. No.: 835,185

[22] Filed: Mar. 3, 1986

[51] Int. Cl.[4] .............................................. B05D 3/06
[52] U.S. Cl. .................................... 427/44; 118/642; 156/273.5; 250/492.3; 427/35
[58] Field of Search ............................. 427/35, 36, 44; 250/492.1, 492.3; 118/641, 642; 156/273.3, 273.5

[56] References Cited

U.S. PATENT DOCUMENTS

| | | | |
|---|---|---|---|
| 3,644,161 | 2/1972 | Hall | 156/273.5 |
| 3,658,620 | 4/1972 | Hall | 427/44 |
| 3,702,412 | 11/1972 | Quintal | 313/299 |
| 3,810,816 | 5/1974 | Zachariades | 427/44 |
| 4,230,766 | 10/1980 | Gaussens et al. | 427/54.1 |
| 4,246,297 | 1/1981 | Nablo et al. | 427/44 |
| 4,252,413 | 2/1981 | Nablo | 250/310 |
| 4,460,427 | 7/1984 | Haney et al. | 156/273.3 |
| 4,521,445 | 6/1985 | Nablo et al. | 427/44 |
| 4,537,811 | 8/1985 | Nablo | 428/166 |
| 4,544,573 | 10/1985 | Dobashi et al. | 427/44 |
| 4,713,935 | 1/1973 | Grecchi | 427/54.1 |

Primary Examiner—John H. Newsome
Attorney, Agent, or Firm—Rines and Rines, Shapiro and Shapiro

[57] ABSTRACT

A method and apparatus for coating non-woven and other porous webs and the like with controlled or negligible penetration into the pores by subjecting a coating carried by a surface to electron beam radiation before laminating the web to the surface carrying the coating and with a radiation dose that only partially cures the coating into a soft or tacky state such that the laminating will effect surface spreading adhesion to the web with controlled or substantially no penetration into the pores, and thereafter subjecting the laminated web and partially cured coating to greater electron beam radiation fully to cure the coating.

20 Claims, 2 Drawing Figures

METHOD OF AND APPARATUS FOR ELECTRON BEAM CURING COATED, POROUS AND OTHER WEB STRUCTURES

The present invention relates to methods of and apparatus for electron beam radiation curing of coatings on surfaces, being more particularly directed to coatings that may be used with porous and other substrates or webs wherein it is desired not to have the coating material penetrate into the pores, as for such purposes as maintaining hand and low inexpensive coating weights.

Electron beam curable coatings have heretofore been applied by numerous techniques and apparatus for a wide variety of coating materials on a wide variety of webs or substrates, all hereinafter often generically termed "webs", as described, for example, in U.S. Pat. No. 4,246,297 of common assignee of the present invention. Such curing has been effected within shielded housings such as those described, for example, in U.S. Pat. No. 4,252,413 of said common assignee, and with longitudinally extending electron beams, as well as others, as described, for example, in U.S. Pat. No. 3,702,412. The use of cooled metal drum surfaces for aiding in such curing have also been found advantageous as described, for example, in U.S. Pat. No. 4,521,445.

There are however, occasions, where, irrespective of the technique employed for the coating of webs—whether direct coating, drum curing, release layer application and curing, etc., as described in said letters patents, for example—it is desired to achieve a coating with a particular type of mechanical and cured adhesion largely unobtainable with the techniques above described. One such problem area resides in the case of applying a light weight barrier, decorative or other cured coating to thin, non-woven porous materials, as for use in disposable non-woven garments or other similar items and which inherently have micro-porous structures to enable breathing of the product as it might be used for clothing, bedding or the like. With such and other structures, it is essential that the coating or barrier or other surface to be applied, be restricted to adhesion on the surface of the non-woven fabric, paper, or similar substrate or web in which the coating material does not fill or otherwise penetrate into the pores of the web material.

It is primarily to such and related types of problems that the present invention is directed, it being an object of the invention to provide a new and improved method of and apparatus for electron-beam curable coating that is of particular use with porous webs and the like wherein it is desired to adhere the coating as a cured coating to a surface of the web with negligible or controlled minimal penetration into the pores of the same.

In U.S. Pat. No. 4,537,811, a process for rendering rough or topographically irregular surface substrates smooth is disclosed, which is very useful for such purposes and which also is an approach to controlling and/or preventing penetration into, at least, the surface irregularities of the substrate. The present invention, on the other hand, is concerned with producing these results by a different technique that also provides a possible substitute for the present dirth of satisfactory commercial electron beam-curable, pressure-sensitive coatings and the like. Specifically, the invention enables the imbuing of electron beam-curable coatings with at least temporary properties of tackiness or softness resembling pressure-sensitive characteristics, as an intermediary in the total curing process of the invention, in producing a cured coating on non-woven or other porous webs and the like with such controlled or negligible penetration into the pores of the web.

A further object of the invention, therefore, is to provide a novel method and apparatus that are adapted to obtain results otherwise desired in electron beam-curable pressure-sensitive adhesives and the like, with electron beam-curable coatings that do not actually have such inherent properties.

A further object of the invention is to provide a novel method of and apparatus for producing such coatings that are also more generally useful with substrates and surfaces that are not porous, but wherein the type of spreading adhesion achieved by the invention is desired.

Other and further objects will be explained hereinafter and will be more particularly delineated in the appended claims.

In summary, however, from one of its broadest aspects, the invention contemplates a method of producing a porous web with a surface adhering coating with negligible penetration into the pores of the web, that comprises, moving a surface (which may be a release surface where the same is not desired as a permanent member of the ultimate lamination) carrying an electron-curable liquid coating along a predetermined path; passing a porous web for laminating contact with said coating along said path; subjecting the coating to electron beam radiation through the web before such laminating while adjusting the radiation dose only partially to cure the coating before lamination, such that it is soft or tacky, with the laminating step effecting surface spreading and adhesion with the web substantially without penetration into the pores; and immediately subjecting the laminated web and partially cured coating to further electron beam radiation of greater dose and also directed through said web fully to cure the coating. In the case in which the surface is a release surface, such as a release paper or layer or drum or other cylindrical moving surface, the same is stripped from the coating after the full cure. Preferred apparatus embodiments and best modes are hereinafter set forth together with details of construction.

Figure 2:
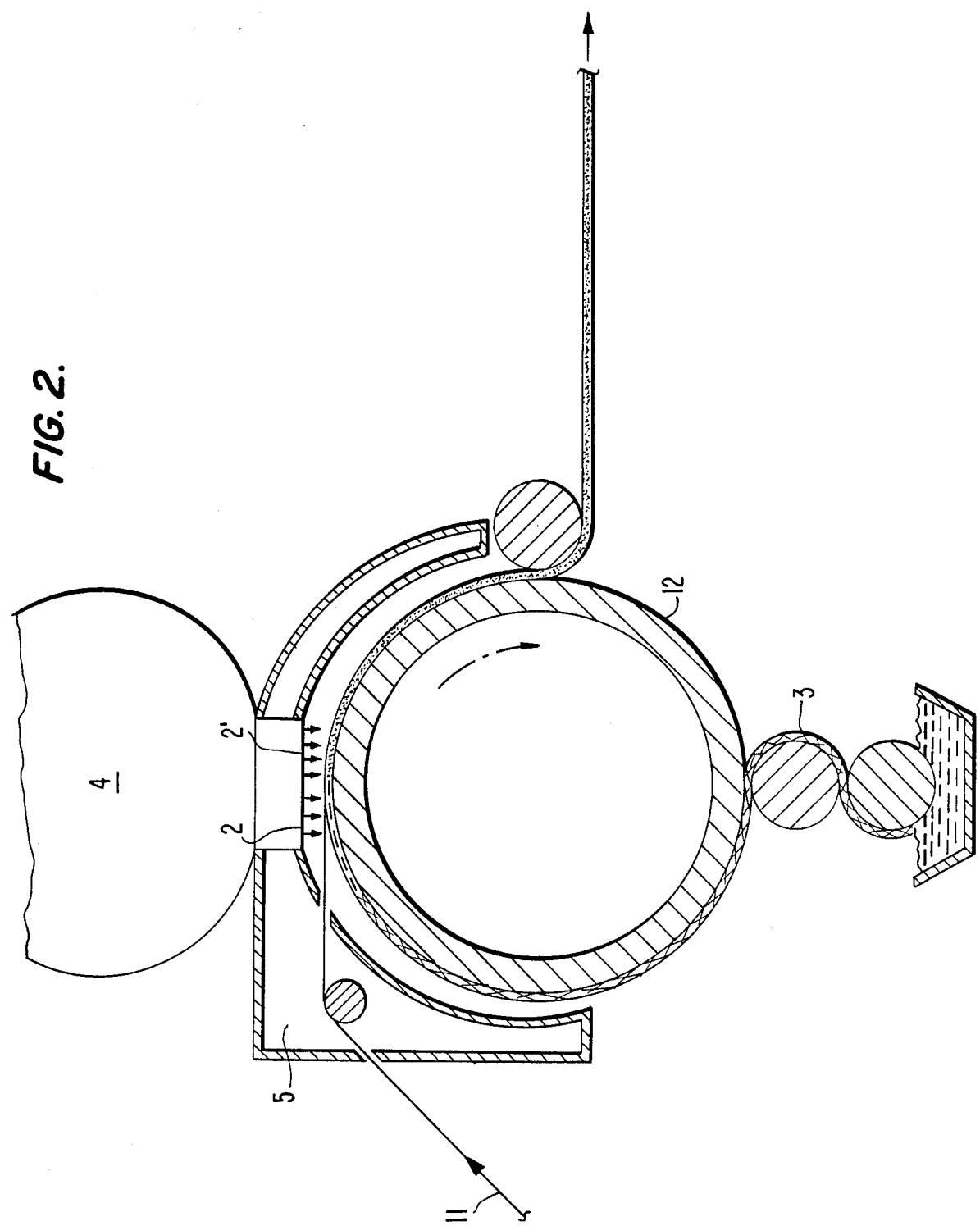

The invention will now be described with reference to the accompanying drawings, FIG. 1 of which is a longitudinal schematic sectional view, ilustrating the invention in preferred form; and FIG. 2 is a similar view of a modification adapted for use with a cylindrical moving metal drum or belt surface.

Referring to FIG. 1, a non-porous web surface (1) carrying an electron beam-curable liquid coating (3), is shown inclinedly fed within an inclined inlet slot of a shielded electron beam housing (5), as of the type described, for example, in said U.S. Pat. No. 4,252,413, over a cooling roll (7) to a laminating roll station (9) and thence over a further cooling roller (7$^1$) finally to exit at the right-hand inclined outlet slot opening of the shielded housing (5). In the region where the electron beam-curable liquid coating carried by the surface (1) passes over the roll (7), electron beam energy, such as the longitudinal type of beam described in the above mentioned Letters Patent, is directed through a window (2) of a first part of an evacuated electron beam generator (4), again, for example, as of the type described in said Letters Patent, so that the coating (3) carried by the surface (1) is subjected at such region to electron beam radiation, through the window (2).

In accordance with the present invention, in that same region where the electron beam radiation exits the window (2) and is directed upon the coating (3) as it is passing over the roll (7), the porous web (11) or other substrate surface that it is desired to coat, downwardly inclinedly enters the left-hand upper portion of the shielded housing (5) through an appropriate slot opening and is fed to the laminating roller station (9) for lamination with the coating (3) as carried thereby on the surface (1). The radiation penetrating from the window (2) is shown by arrows thus directed through the web (11) before it becomes laminated with the coating in order, in accordance with the present invention, to render the liquid coating (3) in a soft or tacky or adhesive-like state through the adjustment of the radiation dose to insure only partial curing of the coating before lamination. This can be aided by controlling the oxygen content of the medium above the adhesive—the presence of oxygen or air inhibiting the curing at the surface and thus having an effect on the level of tack. The laminating forces exerted at the station (9) will cause this soft or tacky coating (3), thus partially electron beam radiation-cured, to spread into a mechanical adhesion with the undersurface of the porous web (11) and, because of the partial curing, unlike the properties of the original liquid coating, will have controlled or negligible penetration into the pores of the porous web (11).

The laminated structure (11-3), partially cured, is then subjected to further electron beam radiation of greater dose (heavier arrows) at the window ($2^1$) of the electron generating apparatus (4) to effect a full cure of the coating as it is in spreading mechanical adhesion with the undersurface of the porous web (11). The medium in this irradiation zone may be controlled by limiting or eliminating the oxygen, as by using an inert gas, such as nitrogen, carbon dioxide and water vapor and the like, employed to assure a hard adhering surface to the non-woven product. In the case where the surface (1) is a release paper or layer and it is only desired to have the coated porous web (11) as the lamination, a release layer stripping section (13) may be provided, as is well known, to strip the surface (1) from the cured structure (11-3). Where, however, a surface (1) is desired as part of the lamination, such stripping will not be effected.

If desired, moreover, the release surface (1), if used, may be patterned, such as for decorative purposes or controlling of gloss or other properties.

As an example of the way in which the system of FIG. 1 may be applied to the problem of providing microporous non-woven webs (11), for example, with bacterial-inhibiting barrier or other coatings at low cost, using minimum weight coating materials with good comfort characteristics and without loss of porosity in the web, a suitable electron beam curable coating (3) may be of the types described, for example, in U.S. Pat. No. 4,466,931, or other coatings with solvent bases may be employed, as well. In the case of non-porous webs, suitable coatings may include, for example, the Valspar Corporation 76X298B and 79E363C acrylate-resin solvent-free coatings. The coating thickness may be of the order of anywhere from several tenths of a mil to perhaps ten or fifteen mils. The first electron beam radiation for the partial cure may be of the order of a tenth of a megarad or up to about one megarad; whereas the greater dose for the final cure of the radiation directed through the window ($2^1$) may be from one to four megarads, more or less.

While the invention has been shown in FIG. 1 as applied to an in-line production system with the different zones of electron beam radiation disposed in serial or successive fashion as the webs continue moving along the predetermined path through the shielded housing (5), the before-mentioned use of a metal drum surface or other continuous metal or similar cylindrical surface, including a metal belt or web, may also be employed, as shown in the modification of FIG. 2. The porous or similar web (11) is shown passed along the predetermined path within the shielded housing or enclosure (5) over the top of a metal shielded drum surface (12) as, for example, of the types disclosed in the above mentioned U.S. Pat. No. 4,521,445, or other similar structures. The electron beam-curable coating material (3) is shown applied to the bottom exterior of the surface of the rotating drum (12) and is carried by the drum surface upward to the left toward top center of the drum, at which region the partial-dose electron beam radiation is directed at (2) through the web (11) prior to joining or laminating of the two by the contact of the web over the top of the drum. After such lamination, the increased radiation at ($2^1$), indicated in heavier lines as in FIG. 1, then effects the total or complete cure of the partial cure effected by the lesser radiation which rendered the coating soft or tacky to permit the spreading adhesion contact before-referenced at the laminating or joining of the web (11) with the partially cured adhesive at top center of the drum (12), this laminating being aided by tensin in the web drive over the drum. The resulting cured coating is carried with the web (11), to which it has been laminated, down the right-hand quadrant of the drum (12) and then is stripped off the drum surface to the right, as shown.

Whereas in the system of FIG. 1, two separate beam generating systems with respective windows (2) and ($2^1$) are shown, and are probably required because of the intermediary presence of the laminating system (9), in the system of FIG. 2 a single electron beam generator may be used with the light dose indicated at (2) being effected by the positioning of the parts or angle of the web (11) as it is drawn toward the drum. Alternatively, there could be grading of the current distribution of the beam, including, if pulsed radiation as distinguished from continuous radiation is used, increased dose rates at the right-hand section.

In connection with the system of FIG. 2, moreover, a cast coating may be employed if the web is actually itself stripped from the cured coating and it may contain pattern information, as well. Similarly, of course, the drum surface itself could be patterned.

Further modifications will also occur to those skilled in this art and such are considered to fall within the spirit and scope of the invention as defined in the appended claims.

What is claimed is:

1. A method of providing a porous web with a surface-adhering coating with negligible penetration into the pores of the web, that comprises, moving a surface carrying an electron-curable liquid coating along a predetermined path; passing a porous web for laminating contact with said coating along said path; subjecting the coating to electron beam radiation through the web before such laminating while adjusting the radiation dose only partially to cure the coating before lamination, such that it is soft or tacky, with the laminating step effecting surface spreading and adhesion with the web substantially without penetration into the pores, and immediately subjecting the laminated web and partially cured coating to further electron beam radiation of greater dose and also directed through said web fully to cure the coating.

2. A method claimed in claim 1 and in which said surface is a release surface and the same is stripped from the coating after its full cure.

3. A method as claimed in claim 1 and in which the partial curing is continued during the laminating.

4. A method as claimed in claim 2 and in which the release surface comprises a non-porous web which, after the full cure of the coating, is stripped therefrom.

5. A method as claimed in claim 2 and in which the release surface comprises a cylindrical moving surface which carries the coating first for the partial cure and then laminating and then full cure before stripping from the cured coating.

6. A method as claimed in claim 2 and in which the release surface is patterned.

7. A method as claimed in claim 5 and in which the partial curing, laminating and full curing spreadingly adheres the coating to said web.

8. A method as claimed in claim 1 and in which said dose for partial curing is of the order of substantially from a tenth of a megarad up to one megarad, and the said greater dose is of the order from substantially one to four megarads.

9. A method of providing a web with a surface-adhering coating, that comprises, moving a surface carrying an electron-curable liquid coating along a predetermined path; passing a web for laminating contact with said coating along said path; subjecting the coating to electron beam radiation through the web before such laminating while adjusting the radiation dose only partially to cure the coating before lamination, such that it is soft or tacky, with the laminating step effecting surface spreading and adhesion with the web; and immediately subjecting the laminated web and partially cured coating to further electron beam radiation of greater dose and also directed through said web fully to cure the coating.

10. A method as claimed in claim 9 and in which said surface is a release surface and the same is stripped from the coating after its full cure.

11. Apparatus for providing a porous web with a surface-adhering coating with negligible penetration into the pores of the web, having, in combination, means for moving a surface carrying an electron-curable liquid coating along a predetermined path within a shielded enclosure; means for passing a porous web into said shielded enclosure and for laminating contact with said coating along said path; electron beam generating means within the enclosure for subjecting the coating to electron beam radiation through the web before such laminating with the radiation dose adjusted only partially to cure the coating before lamination, such that it is soft or tacky, with the laminating step effecting surface spreading and adhesion with the web substantially without penetration into the pores; the electron beam generating means having means for immediately a subjecting the laminated web and partially cured coating to further electron beam radiation of greater dose and also directed through said web fully to cure the coating.

12. Apparatus as claimed in claim 11 and in which said surface is a release surface and means is provided for stripping the same from coating after its full cure.

13. Apparatus as claimed in claim 12 and in which the release surface comprises a non-porous web which, after the full cure of the coating, is stripped therefrom.

14. Apparatus as claimed in claim 12 and in which the release surface comprises a cylindrical moving surface which carries the coating first for the partial cure and then laminating and then full cure before stripping from the cured coating.

15. Apparatus as claimed in claim 14 and in which said cylindrical moving surface comprises metal drum means disposed within said enclosure.

16. Apparatus as claimed in claim 14 and in which said cylindrical moving surface comprises a metal surface.

17. Apparatus as claimed in claim 14 and in which the partial curing, laminating and full curing spreadingly adheres the coating to said surface.

18. Apparatus as claimed in claim 14 and in which said dose for partial curing is of the order of substantially from a tenth of a megarad up to one megarad, and the said greater dose is of the order from substantially one to four megarads.

19. Apparatus for providing a web with a surface-adhering coating, having, in combination, means for moving a surface carrying an electron-curable liquid coating along a predetermined path within a shielded enclosure; means for passing a web into said shielded enclosure and for laminating contact with said coating along said path; electron beam generating means within the enclosure for subjecting the coating to electron beam radiation through the web before such laminating with the radiation dose adjusted only partially to cure the coating before lamination, such that it is soft or tacky, with the laminating step effecting surface spreading and adhesion with the web; the electron beam generating means having means for immediately subjecting the laminated web and partially cured coating within said enclosure to further electron beam radiation of greater dose and also directed through said web fully to cure the coating.

20. A method as claimed in claim 9 and in which the oxygen or air in the atmosphere in the region of the partial curing is controlled to inhibit the curing at the surface and thus effect the level of the tack, and oxygen is limited or eliminated from said atmosphere in the region of the full cure when said web is porous.

* * * * *

Notice of Adverse Decision in Interference

In Interference No. 102,406, involving Patent No. 4,642,244, E. P. Tripp III, J. Weisman, G. Hissong, METHOD OF AND APPARATUS FOR ELECTRON BEAM CURING COATED, POROUS AND OTHER WEB STRUCTURES, final judgement adverse to the patentees was rendered Jan. 23, 1991, as to claims 1-10 and 20.

*(Official Gazette March 5, 1991)*